G. C. BEIDLER.
METHOD OF AND APPARATUS FOR DEVELOPING FILMS.
APPLICATION FILED MAR. 31, 1917.
1,414,769.
Patented May 2, 1922.
3 SHEETS—SHEET 2.
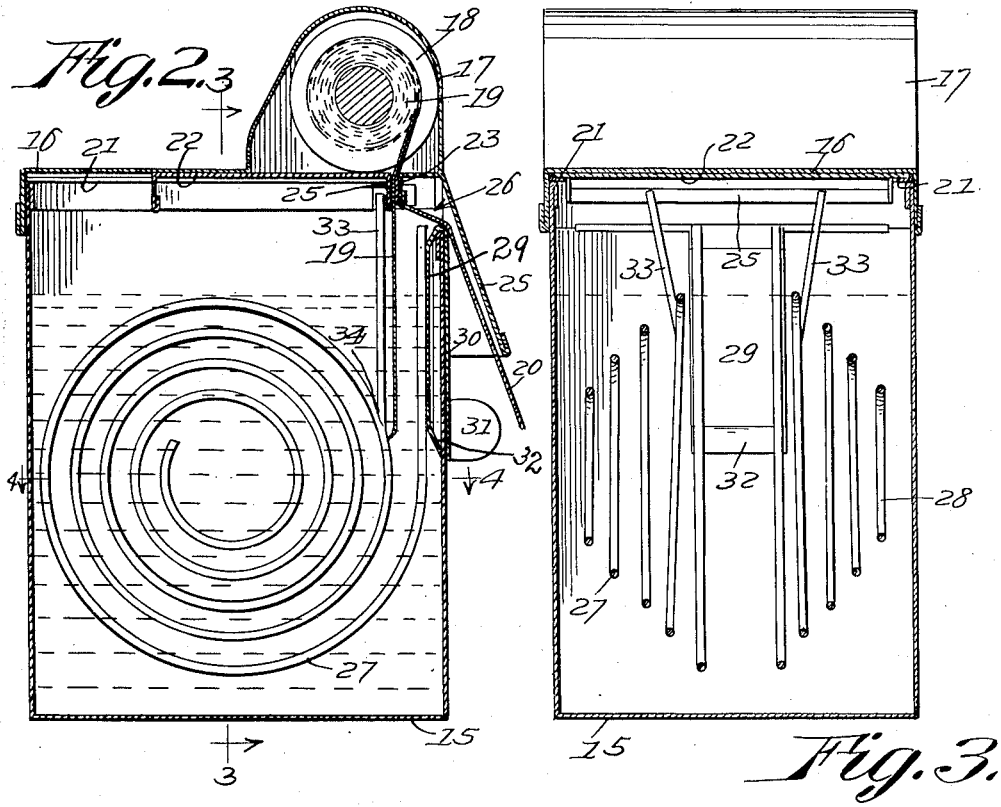
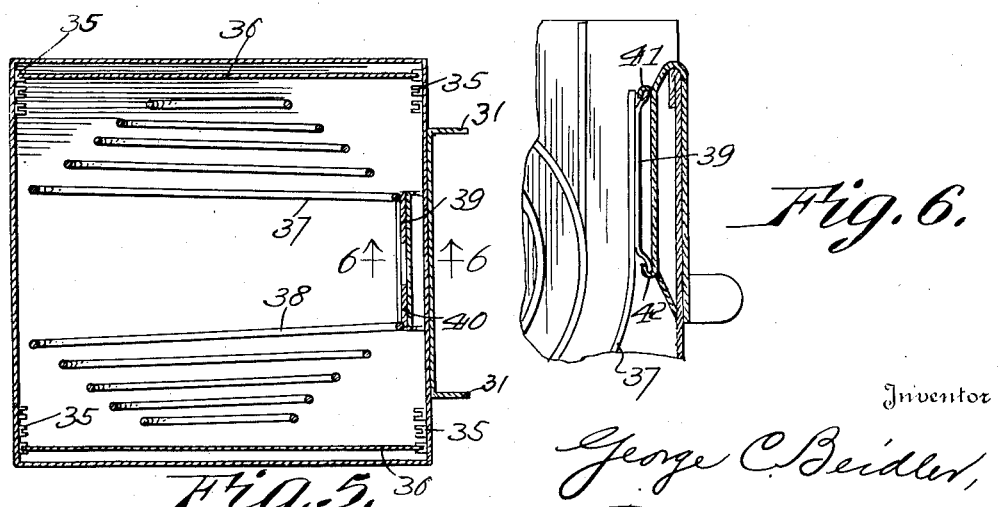

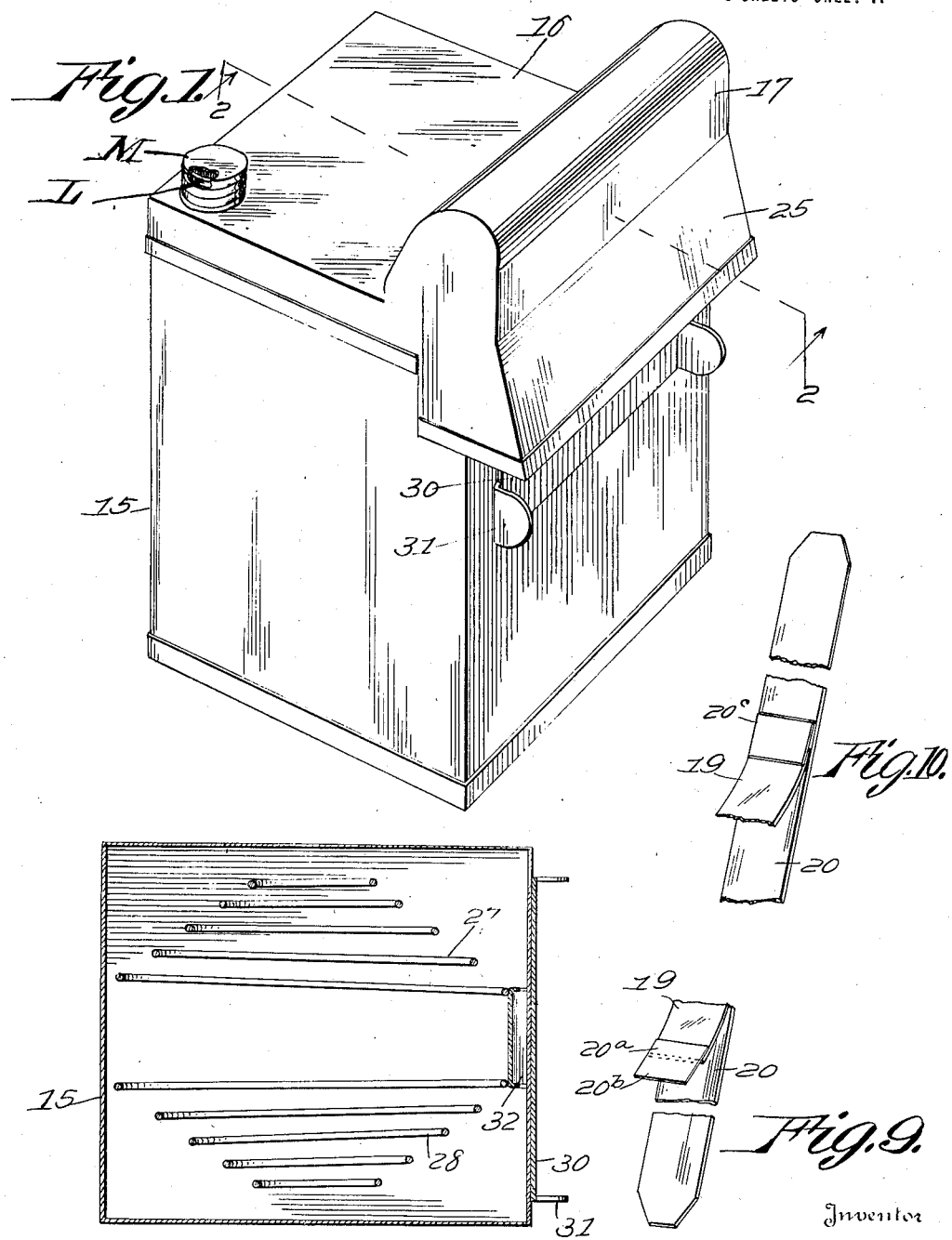

G. C. BEIDLER.
METHOD OF AND APPARATUS FOR DEVELOPING FILMS.
APPLICATION FILED MAR. 31, 1917.

1,414,769.

Patented May 2, 1922.

Inventor
George C. Beidler,
By Frank S. Appleman
Attorney.

UNITED STATES PATENT OFFICE.

GEORGE C. BEIDLER, OF ROCHESTER, NEW YORK.

METHOD OF AND APPARATUS FOR DEVELOPING FILMS.

1,414,769.          Specification of Letters Patent.      Patented May 2, 1922.

Application filed March 31, 1917. Serial No. 158,816.

*To all whom it may concern:*

Be it known that I, GEORGE C. BEIDLER, a citizen of the United States of America, and resident of Rochester, in the county of Monroe and State of New York, have invented certain new and useful Improvements in Methods of and Apparatus for Developing Films, of which the following is a specification.

This invention relates to photography and particularly to apparatus or means for and method of developing film, the said device being intended primarily for developing lengths of film having a plurality of exposures thereon and which is capable of being used in the daylight without liability of injury to the sensitized surface of the film, through exposure.

A further object of this invention is to provide a film holding means to which the film may be delivered by thrusting the said film edgewise into the film holder, the said film holder having a convolution or coil or a plurality of convolutions or coils with spaces in which the film may travel while being thrust into the said holder.

A further object of this invention is to provide means for holding the film to be protected so that it is protected from the rays of actinic light while being delivered to the holder and the said invention is preferably provided or associated with means whereby the so-called spool of sensitized film may be held while the film is removed therefrom and delivered to the film holder, and the invention furthermore has for its object the provision of means whereby the protecting strip which is utilized on films now in common use may be removed from the film while or prior to the time the film is delivered to the holder, and means have been devised, and constitute part of the invention, for utilizing said protecting strip as a means for communicating motion to the film and transferring it from the spool to the said holder, thus making it possible by pulling the said protecting strip to force the film into the holder, so that the said film will follow the convolutions of the holder and be coiled in a comparatively small space, so that the film may be subjected to the developing fluid and to that end the said holder is preferably applied to a receptacle adapted to contain developing fluid.

With the foregoing and other objects in view, the invention consists in the broad idea, as well as in the details of construction, to be set forth in the claims during the prosecution of the application, the said claims to be of such scope as to give protection commensurate with the inventive act in view of the state of the art, when the said invention was produced.

In describing the invention in detail, reference will be had to the accompanying drawings forming part of this specification, wherein like characters denote corresponding parts in the several views, and in which—

Figure 1 is a view in perspective of a receptacle showing a portion of the developing device;

Figure 2 is a vertical sectional view on the line 2—2 of Figure 1;

Figure 3 is a vertical sectional view on the line 3—3 of Figure 2;

Figure 4 is a horizontal sectional view on the line 4—4 of Figure 2;

Figure 5 is a horizontal sectional view through the developing tank, showing a modification;

Figure 6 is a vertical sectional view through the front wall of the developing tank, on the line 6—6 of Figure 5;

Figure 9 is a perspective view of a fragment of the film with the protecting strip, with the film detached from the protecting strip;

Figure 10 is a perspective view of a fragment of the protecting strip and film, with the film attached to the protecting strip.

Figure 7:
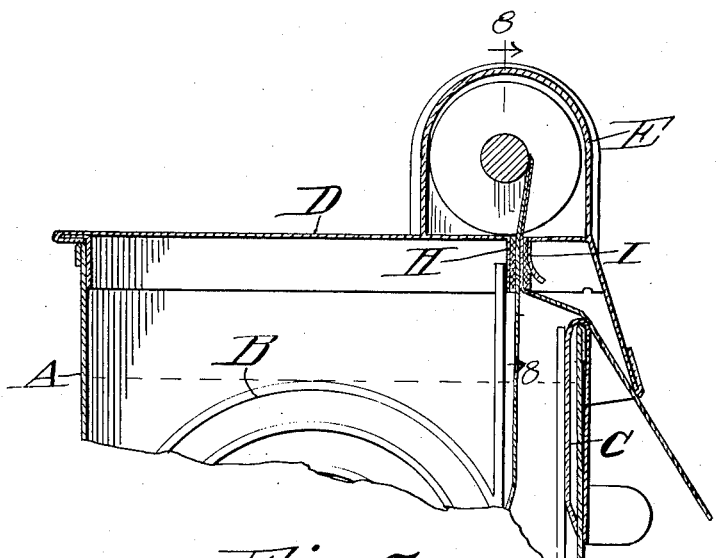
Figure 7 is a longitudinal section through the closure of the developing tank, of a modified structure.

In these drawings 15 denotes a receptacle of any appropriate capacity or depth and of any cross sectional area but preferably square or rectangular in plan. A cover 16 is adapted to be applied to the said receptacle and said receptacle has a hood 17 of such configuration as to contain a spool 18 on which a film 19 and a protecting strip 20 may be wound as is commonly done with photographic films which are used in roll holding cameras, it being the purpose of the invention to provide a space which will accommodate the spool with the film and protecting strip wound on it, so that the said film and protecting strip may be removed from the spool as will presently appear.

The interior of the cover has a guideway 21 at each end in which a shutter 22 is slidable and the said shutter is adapted to move into and out of operative relation to a flange 23 which is secured to or forms a part of the cover, it being the purpose of the said shutter to close the space below the hood of the cover to exclude light from the said hood when film is contained within the hood.

As shown in the drawing, the film spool rests on the shutter after the cover has been applied to the receptacle and the cover has a flared downwardly extending apron 25 which forms a clearance for the passage of the protecting paper 20 as it is drawn from the receptacle, and there is a clearance or opening 26 between the cover and the receptacle through which the said protecting paper may be drawn as the paper and film are unwound from the spool. During the withdrawal of the paper from the spool, the film which has been separated from it passes to the interior of the receptacle and is coiled on a holder, to be presently explained, so that the said film may be subjected to the action of developing fluid or the like, contained in the receptacle.

The holder for the film, in the present embodiment of the invention, preferably comprises two coils or convolutions 27 and 28 of metal and preferably the convolutions of each holder are out of alinement, an arrangement which has been found desirable since it prevents undue contacting of the film with said holder at given points or at the same point. The holders are preferably secured to a sliding member 29 which is supported on the upper edge of the receptacle, the said holder having an extension 30 lying against the outer surface of the said receptacle and being provided with ears 31. The member 29 within the receptacle is preferably bent so that only the lower edge 32 contacts with the inner wall of the receptacle, as it has been found that the clearance created by the configuration of the said member prevents capillary attraction of the liquid within the receptacle and, therefore, it is, so far as the inventor knows, the preferred construction.

In order to guide the film to the holder, guiding fingers 33 are secured to the said holders and the finger of one member diverges with respect to the finger of the other member at their upper ends, so that this relation of the guiding fingers to one another also prevents injury to the film as they do not engage any one portion of the film unduly. The guiding fingers 33 may be soldered or otherwise secured to the holders as at 34 and they preferably engage the flange of the shutter to insure an engagement of the film which will cause the film to travel downwardly and follow the convolutions of the holders.

In practice, it has been found that after a film has been exposed and has been wound on the receiving spool of the camera, the said receiving spool may be removed from the camera as is now ordinarily done, and thereafter, the said spool may be placed in the hood of the cover with the protecting strip of the film extending between the shutter and the flange 23, and the said protecting strip can then be drawn until the film appears and with films now in common use, one end of the film is free from the film but has a gummed strip so that it may be used as a sticker. When this gummed sticker is reached, the protecting strip and sticker are separated so that the protecting strip extends outside of the receptacle after which the cover may be applied, and, thereafter, with the protecting strip and sticker attached to the end of the film extending outside of the receptacle, the sticker is cut from the end of the film, then the cover may be applied to the receptacle so that the protecting strip will extend between the apron and the receptacle in order that the said protecting strip may be manipulated to unwind the said protecting strip and film from the spool, the power applied for removing the protecting strip from the spool being utilized and effective to project or force the film into the holder so that the film is wound or caused to follow the convolutions of the holder or holders. As it is the purpose of the inventor that the receptacle shall hold developing fluid, the film which is wound in the holder is subjected to the action of the developing fluid.

In order to agitate the film for the purpose of displacing air bubbles which may collect on the surface thereof as it is forced into the liquid and distribute the liquid over the surface of the film uniformly, the holders may be manipulated so that they slide in the receptacle to an appreciable extent and in order to accomplish this, the member 29 may be slid on the edge of the receptacle by pressure on the ears 31, which lie outside of the said receptacle, it being understood that the said member and the extension 30 constitute what might be termed a "hanger" supported on the wall of the receptacle.

After the protecting strip has been drawn from the receptacle until the end of the film is reached and the film has been allowed to remain in the developing fluid a predetermined time until the development has taken place, the cover may be removed and the protecting strip may be detached and thereafter the film may be drawn from the holder or, if desired, the film may be drawn from the holder prior to the removal of the protecting strip. The developed film may then be subjected to the action of the fixing fluid and it may be deposited in any suitable receptacle containing said fixing fluid as is ordinarily done in the photographic process.

Provision may be made for operating on films of different widths, using the same apparatus, the same being accomplished by the use of guides 35 and partitions 36, which partitions may be placed in different guides to increase or diminish the width of the receptacle, as occasion may require. When a receptacle having the adjustable partitions is employed, it is also desirable that the holders for the film should be adjustable with relation to each other and with relation to the receptacle, and to that end, the holders 37 and 38 are provided with plates 39 and 40 respectively, which are adjustable in the sliding member so that they may be moved laterally of the said sliding member. When this last mentioned expedient is employed, the sliding member is made with curved flanges 41 and 42, between which the plates 39 and 40 are adjustable and by which they are held. Therefore, when the partitions are employed, the holders may be adjusted relatively thereto so that the film which is delivered to the holders may have its edges in proper relative position to the side walls of the receptacle.

The film 19 and protecting strip 20 shown in Figures 9 and 10 illustrate the manner in which the protecting strip and film are attached and at 20ª the film is shown as detached from the protecting strip and preferably, the small tab 20ᵇ which is usually employed, as a means for attaching the film to the protecting strip, is cut away prior to the delivery of the film to the holder. The fact that the film and protecting strip are still attached at the point 20ᶜ insures that the motion of the protecting strip as it is drawn from the roll will be communicated to the film, so that it may be thrust or forced into the receptacle and into the coiled holder.

While I have referred to the element 17 as a hood, it is to be understood that the purpose thereof is to contain the spool of film, and, therefore, it might also be properly called a magazine or film holder, and any appropriate housing may be employed in this connection and as a substitute having the equivalent function.

Figure 8:
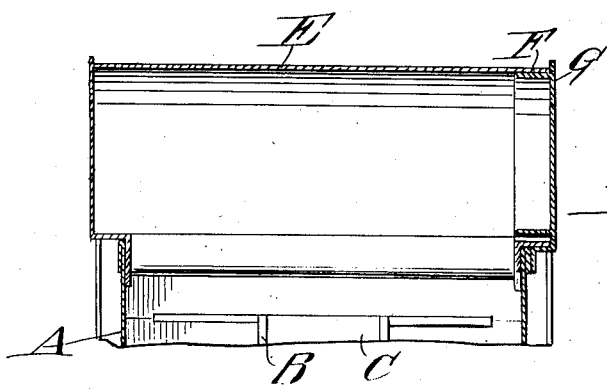
Figure 8 is a transverse section through closure on the line 8—8, of Figure 7.
Figure 11:
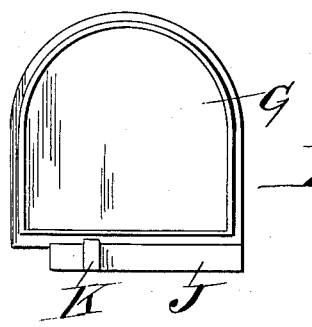
Figure 11 is an inside elevation of the closure cap, in modification shown in Figure 8.

In Figures 7, 8 and 11, there is a modified construction illustrated for containing the spool and for guarding the contents of the spool from actinic light. In this embodiment of the invention, the receptacle A, film holder B and sliding member C may be of the construction heretofore described and it will not, therefore, be referred to in detail in connection with the disclosure of this modification. The cover D has a magazine or receptacle E with an open end F closed by a cap G. In this embodiment of the invention, the receptacle for the spool is wholly enclosed except for the open end and for a slot H which leads from the bottom of the cover to the receptacle containing the spool, and the slot is supplied with a shield or filler I past which the film and protecting strip is drawn in removing the film and protecting strip from the spool. In applying the spool to the receptacle or magazine, the cap is removed and the protecting strip is unwound from the spool until the point of attachment of the film is reached, after which the spool is applied to the receptacle and the edge of the film and of the protecting strip are inserted in the slot or opening until the spool has been entirely encased by the receptacle after which the cap is applied to the end of the receptacle, and the operation of removing the film and protecting strip from the spool is carried out in the manner in which it is carried out in the device hereinbefore described.

In order to guard the opening in the edge of the cover through which the film and protecting strip are delivered to the slot H, the cap has a depending flange J with a lug K thereon, which fits in the slot in the edge of the cover.

While I have referred to the film being subjected to the action of the developer, it is understood that other fluids adapted to act on the coated surface of the film may be used in conjunction with the film holder. Furthermore, when reference is had herein to the term "protecting strip" I mean thereby any flexible device which may accompany or be operatively associated with the roll of the film. In the so-called autographic cameras, the protecting element consists of two strips of paper so that the term "protecting strip" as employed herein is meant to include such equivalent devices, whether they be one or a plurality of elements accompanying the film to guard it against light, or for other purposes.

The top has a threaded nipple L, through which the receptacle may be filled and the said nipple has a cap M.

The sliding member is effective to move the film holder with relation to the sides of the receptacle so that in addition to displaceing air bubbles, the film may engage the side of the receptacle and the holder may be moved with relation to the film so as to permit the fluid to gain access to all the surface of the film and to prevent any marks of the film holder on the film.

I claim:

1. A device relating to photography and comprising a receptacle, movable supporting means carried therein, and a film holder comprising a coil whose convolutions are of increasing diameter mounted within the receptacle upon said supporting means with the axis of the coil parallel to the direction of motion of said supporting means.

2. In a device relating to photography, coil form film holders each comprising a coil whose convolutions are of increasing diameter, film roll supporting means in such relation to the film holders as to deliver film to the said film holders when the film is unwound, and means for adjustably supporting the film holders with relation to each other.

3. In a device relating to photography, a coil form film holder, a receptacle for fluid and containing the film holder, a cover for the receptacle having a film roll magazine open to the receptacle, the said cover being open and to the exterior of the receptacle, whereby film from a roll passes to the holder and a protecting strip of the film travels to the exterior of said receptacle.

4. In a device relating to photography, a receptacle, a film holder comprising a coil whose convolutions are of increasing diameter mounted within the receptacle, the convolutions of said coil being both radially and axially spaced from each other, and means for holding the film holder in the receptacle.

5. In a device relating to photography, a spiral form film holder, the volutions of the spiral being both radially and axially spaced with relation to each other, means for movably mounting the film holder in a receptacle, and means for guiding film to the film holder.

6. In a device relating to photography, a receptacle, a spiral form film holder therein, the volutions of the spiral being both radially and axially spaced with relation to each other, a holder for a roll of film in position to deliver film from the roll to the said holder, and means for guiding the film to the said holder.

7. In a device relating to photography, a receptacle, a coil form film holder therein, means for holding a roll of film with its protecting strip thereon, a cover for the receptacle having a clearance between the receptacle and the cover for the passage of the protecting strip therethrough when it is pulled from the roll, said roll holder being in position to deliver the film to the holder when the strip is drawn from the roll, and a guide for directing film from the roll to the film holder.

8. A device relating to photography and comprising a receptacle, film holders each comprising a coil whose convolutions are of increasing diameter, and means for slidably supporting the film holders in the receptacle.

9. A device relating to photography and comprising a receptacle, film holders each comprising a coil whose convolutions are of increasing diameter, means for slidably mounting the film holders in the receptacle, and means for guiding film to the film holders.

GEORGE C. BEIDLER.